Feb. 8, 1938. L. A. LEPPKE 2,107,381
SERVING DEVICE
Filed April 8, 1937
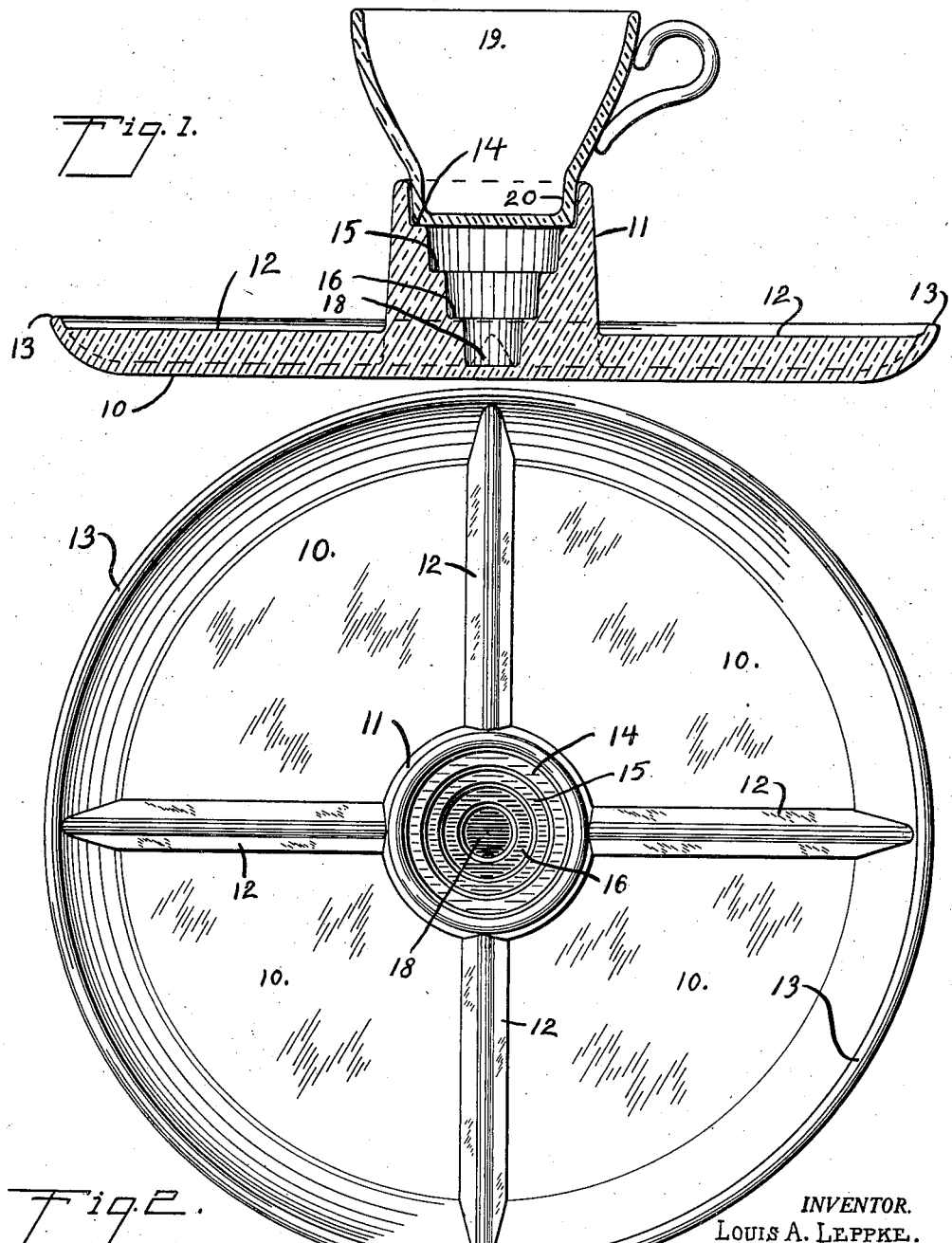
INVENTOR.
LOUIS A. LEPPKE.
BY John C. Baisch
ATTORNEYS.

Patented Feb. 8, 1938

2,107,381

UNITED STATES PATENT OFFICE 2,107,381

SERVING DEVICE

Louis A. Leppke, Omaha, Nebr.

Application April 8, 1937, Serial No. 135,725

4 Claims. (Cl. 65—15)

This invention relates generally to serving devices and particularly to devices for serving Dutch lunches or lap lunches and for lunch service on airplanes, speed trains, cafeterias and the like.

In serving lunches of this character the cup or glass for liquids such as coffee and the like are difficult to hold on the plate or tray and the food on such plate often gets on the cup or glass making same messy to handle. This is particularly likely to happen when the food is soft or has liquids therein such as salad dressing and the like.

It is therefore an important object of my invention to provide a serving tray having means for holding a cup or glass or the like.

Another object of my invention is to provide a device of this character having holding means adapted to hold cups or glasses of various sizes.

Another object of the invention is to provide a device of this character wherein the holding means is adapted to hold cups, glasses and the like of various shapes.

A further object of my invention is to provide a device of this character wherein the cup or glass is removably retained in such position that it will be protected from contact with food on the tray or plate thereof.

A still further object of the invention is to provide a device of this character of simple and durable construction and of low manufacturing cost.

Numerous other objects and advantages of this invention will be apparent as it is better understood from the following detailed description, which, taken in connection with the accompanying drawing, discloses a preferred embodiment thereof.

Referring to the drawing:

Figure 1 is a vertical section through the device, taken on line 1—1 of Figure 2, showing a cup held in the holder.

Figure 2 is a plan view of the device without the cup.

Referring more particularly to the drawing, which illustrates a preferred embodiment of my invention, the device comprises a tray or plate 10 having a holder 11 positioned centrally thereof and upstanding therefrom a distance substantially greater than the thickness of the plate, said holder or supporting member 11 is slightly larger at the bottom than at the top, tapering upwardly and inwardly. Radial ribs or separators 12 extend from the holder 11 to the margin of the plate which has upturned marginal edges 13. The ribs 12 divide the plate into four parts in which various foods may be served; said ribs also serving to reinforce the device. The holder is provided with a longitudinal opening having a series of stepped shoulders 14, 15 and 16 respectively, said shoulders being stepped progressively inwardly from the top down. The opening in the holder extends downwardly, at 18, from shoulder 16 and is closed at the bottom. A light, mouldable composition may be used in making the device or it may be moulded of glass or the like.

A plane extending conically downward in the opening of the holder would touch the inner edges of the shoulders so that a conical or tapering beverage container may be securely seated in the opening, as well as flat bottomed glasses of various sizes, or cups. In Figure 1 a cup 19 is shown removably received in the upper portion of the opening, said cup having a lengthened bottom portion 20 resting on shoulder 14. By lengthening the bottom portion of the cup same is held more firmly in the holder.

The device, when constructed of light material, is ideal for use on airplanes where lightness is highly important.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

Having thus described my invention what I claim is:

1. A serving device comprising a plate having a central integrally formed supporting member upstanding therefrom a distance substantially greater than the thickness of the plate, and having an opening therein, and a plurality of stepped shoulders in said opening, said steps extending progressively inward from the top.

2. A serving device comprising a plate having a central integrally formed supporting member upstanding therefrom a distance substantially greater than the thickness of the plate and having a longitudinal opening therein, said member tapering slightly inwardly from the bottom, and a plurality of stepped shoulders in the opening, said steps extending progressively inwardly from the top, said plate having integral ribs radiating from said member and reinforcing the latter.

3. A serving device comprising a plate having a central integrally formed supporting member upstanding therefrom a distance substantially greater than the thickness of the plate and having a longitudinal opening therein, said member tapering slightly upwardly and inwardly, and a plurality of stepped shoulders in the opening, said steps extending progressively inwardly from the top, the inner edges of said shoulders touching a conical plane extending downwardly in the opening.

4. A serving device comprising a plate having a central integrally formed supporting member upstanding therefrom a distance substantially greater than the thickness of the plate, and having an opening therein, a plurality of stepped shoulders in said opening, said steps extending progressively inwardly from the top, and a cup having a lengthened lower end received in the upper portion of the opening and resting on one of the shoulders.

LOUIS A. LEPPKE.